United States Patent
Lundvall et al.

(10) Patent No.: US 7,770,024 B2
(45) Date of Patent: *Aug. 3, 2010

(54) SECURITY MESSAGE AUTHENTICATION INSTRUCTION

(75) Inventors: Shawn D. Lundvall, Poughkeepsie, NY (US); Ronald M. Smith, Sr., Wappingers Falls, NY (US); Phil Chi-Chung Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 12/029,514

(22) Filed: Feb. 12, 2008

(65) Prior Publication Data

US 2008/0201557 A1 Aug. 21, 2008

Related U.S. Application Data

(63) Continuation of application No. 10/435,910, filed on May 12, 2003, now Pat. No. 7,356,710.

(51) Int. Cl.
*G06F 11/30* (2006.01)
*H04N 7/167* (2006.01)
*G06F 15/00* (2006.01)
*H04L 9/32* (2006.01)

(52) U.S. Cl. .......................... 713/189; 380/225; 712/8; 713/181

(58) Field of Classification Search ................. 713/189, 713/193, 181; 380/225; 712/8
See application file for complete search history.

(56) References Cited

U.S. PATENT DOCUMENTS

| | | | |
|---|---|---|---|
| 4,578,530 A | 3/1986 | Zeidler | |
| 4,829,424 A | 5/1989 | Lee | |
| 5,666,411 A | 9/1997 | McCarty | |
| 5,765,030 A * | 6/1998 | Nachenberg et al. | 714/33 |
| 5,787,302 A | 7/1998 | Hampapuram et al. | |
| 6,542,981 B1 * | 4/2003 | Zaidi et al. | 712/2 |
| 6,996,725 B2 * | 2/2006 | Ma et al. | 726/22 |
| 2001/0029577 A1 | 10/2001 | Worrell et al. | |
| 2002/0184046 A1 * | 12/2002 | Kamada et al. | 705/1 |

(Continued)

FOREIGN PATENT DOCUMENTS

EP 0354774 8/1989

(Continued)

OTHER PUBLICATIONS

Unpublished IBM Document Describing IBM Prior Art, "Cipher Multiple Data", In use more than a year before Feb. 12, 2008. It has been used in IBM products. 15 pages.

(Continued)

*Primary Examiner*—Techane J Gergiso
(74) *Attorney, Agent, or Firm*—John E. Campbell

(57) ABSTRACT

A method, system and computer program product for computing a message authentication code for data in storage of a computing environment. An instruction specifies a unit of storage for which an authentication code is to be computed. An computing operation computes an authentication code for the unit of storage. A register is used for providing a cryptographic key for use in the computing to the authentication code. Further, the register may be used in a chaining operation.

20 Claims, 7 Drawing Sheets

| CODE | FUNCTION | PARM. BLOCK SIZE (BYTES) | DATA BLOCK SIZE (BYTES) |
|---|---|---|---|
| 0 | KMAC-QUERY | 16 | — |
| 1 | KMAC-DEA | 16 | 8 |
| 2 | KMAC-TDEA-128 | 24 | 8 |
| 3 | KMAC-TDEA-192 | 32 | 8 |
| EXPLANATION: |||| 
| — NOT APPLICABLE ||||

U.S. PATENT DOCUMENTS

| | | | |
|---|---|---|---|
| 2002/0191790 A1* | 12/2002 | Anand et al. | 380/255 |
| 2003/0002666 A1 | 1/2003 | Takahashi | |
| 2003/0028765 A1 | 2/2003 | Cromer et al. | |

FOREIGN PATENT DOCUMENTS

| | | | |
|---|---|---|---|
| EP | 0725511 | | 1/1996 |
| GB | 1494750 | | 12/1977 |
| JP | 5093054 | | 7/1975 |
| JP | 56-121138 | | 9/1981 |
| JP | 56149645 | | 11/1981 |
| JP | 56149645 A | * | 11/1981 |
| JP | 11-249873 | | 9/1999 |
| WO | 0111818 | | 8/1999 |

OTHER PUBLICATIONS z/Architecture Principles of Operation, SA22-7832-00, First Edition, Dec. 2000.

US 5,765,050, 06/1998, Nachenberg et al. (withdrawn).

John P. Hayes "Computer Arcbitecture and Organization", 2nd Edition, McGraw-Hill Book Company, 1988, pp. 52-54, 198-201.

Eric Schwarz et al. "The Microarchitecture of the IBM eServer z900 Processor", IBM J. Res & Dev. vol. 46, No. 4/5, Jul./Sep. 2002, pp. 381-395.

Unpublished IBM document describing IBM prior art.

IBM PCI Cryptographic Coprocessor CCA Basic Services Reference and Guide for IBM 4758 Models 002 and 023 with Release 2.40, Sep. 2001, http://www-zone-h-org/files/33/CCA_Basic_Services_240. pdf; pp. 1-1 through 2-19; 6-1 through 6-16; 7-1 through 7-24; B1 through B42; F1 through F4.

Wu et al. "CryptoManiac: A Fast Flexible Architecture for Secure Communication", Proceedings of the 28th International Symposium on Computer Architecture, 2001.

IBM z/Architecture Principles of Operation, SA22-7832-00.

* cited by examiner

KMAC R₁,R₂ [RRE]
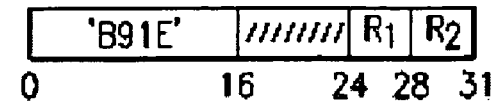
FIG.1
FIG.2
| CODE | FUNCTION | PARM. BLOCK SIZE (BYTES) | DATA BLOCK SIZE (BYTES) |
|---|---|---|---|
| 0 | KMAC-QUERY | 16 | — |
| 1 | KMAC-DEA | 16 | 8 |
| 2 | KMAC-TDEA-128 | 24 | 8 |
| 3 | KMAC-TDEA-192 | 32 | 8 |
EXPLANATION:
— NOT APPLICABLE
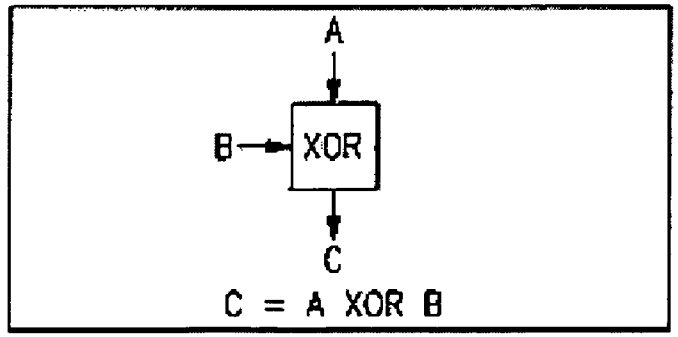
FIG.4
Prior Art
C = A XOR B
FIG.6
| 0 | PARAMETER BLOCK OF THE KMAC-QUERY FUNCTION |
| 8 | |
0    63

FIG.11
Prior Art

| | |
|---|---|
| 0 | CHAINING VALUE (CV) |
| 8 | CRYPTOGRAPHIC KEY 1 (K1) |
| 16 | CRYPTOGRAPHIC KEY 2 (K2) |
| 24 | CRYPTOGRAPHIC KEY 3 (K3) |

1.–6. EXCEPTIONS WITH THE SAME PRIORITY AS THE PRIORITY OF PROGRAM–INTERRUPTION CONDITIONS FOR THE GENERAL CASE.

7.A ACCESS EXCEPTIONS FOR SECOND INSTRUCTION HALFWORD.

7.B OPERATION EXCEPTION.

8. SPECIFICATION EXCEPTION DUE TO INVALID FUNCTION CODE OR INVALID REGISTER NUMBER.

9. SPECIFICATION EXCEPTION DUE TO INVALID OPERAND LENGTH.

10. CONDITION CODE 0 DUE TO SECOND-OPERAND LENGTH ORIGINALLY ZERO.

11. ACCESS EXCEPTIONS FOR AN ACCESS TO THE PARAMETER BLOCK OR SECOND OPERAND.

12. CONDITION CODE 0 DUE TO NORMAL COMPLETION (SECOND-OPERAND LENGTH ORIGINALLY NONZERO, BUT STEPPED TO ZERO).

13. CONDITION CODE 3 DUE TO PARTIAL COMPLETION (SECOND-OPERAND LENGTH STILL NONZERO).

SECURITY MESSAGE AUTHENTICATION INSTRUCTION

CROSS REFERENCE TO RELATED APPLICATIONS

This application is a continuation of now U.S. Pat. No. 7,356,710, previously application Ser. No. 10/435,910 "SECURITY MESSAGE AUTHENTICATION CONTROL INSTRUCTION" filed May 12, 2003.

FIELD OF THE INVENTION

This invention relates to computer system architecture and particularly to new instructions which augment the IBM z/Architecture® and can be emulated by other architectures.

BACKGROUND OF THE INVENTION

Before our invention IBM has created through the work of many highly talented engineers beginning with machines known as the IBM System 360 in the 1960s to the present, a special architecture which, because of its essential nature to a computing system, became known as "the mainframe" whose principles of operation state the architecture of the machine by describing the instructions which may be executed upon the "mainframe" implementation of the instructions which had been invented by IBM inventors and adopted, because of their significant contribution to improving the state of the computing machine represented by "the mainframe", as significant contributions by inclusion in IBM's Principles of Operation as stated over the years. The First Edition of the *z/Architecture Principles of Operation* which was published December, 2000 has become the standard published reference as SA22-7832-00. We determined that further new instructions would assist the art and could be included in a z/Architecture machine and also emulated by others in simpler machines, as described herein.

BRIEF SUMMARY OF THE INVENTION

It is an object of the present invention to provide a CPU-synchronous, problem-state, and sectioning instruction for computing a message authentication code for data in storage of a computer system.

It is a further object of the invention to provide an instruction for computing a message authentication code using a cryptographic key in the computing of the message authentication code.

It is a further object of the invention to provide an instruction for computing a message authentication code using a chaining value for a chaining operation for computing message authentication codes for data in a plurality of storage locations.

BRIEF DESCRIPTION OF THE SEVERAL VIEWS OF THE DRAWING

These and other objects will be apparent to one skilled in the art from the following detailed description of the invention taken in conjunction with the accompanying drawings in which:

FIG. 1 is an illustration of the Compute Message Authentication Code (KMAC) instruction in the RRE instruction format;

FIG. 2 is a table showing the function codes for the KMAC instruction of FIG. 1;

FIG. 4 illustrates the symbol used for Bit-Wise Exclusive Or according to prior art;

FIG. 6 illustrates the format for the parameter block for KMAC-Query;

FIG. 11 illustrates the format for the parameter block for KMAC-TDEA-192 according to prior art;

FIG. 13 is a table showing the priority of execution for KMAC;

DETAILED DESCRIPTION OF THE INVENTION

Figure 3:
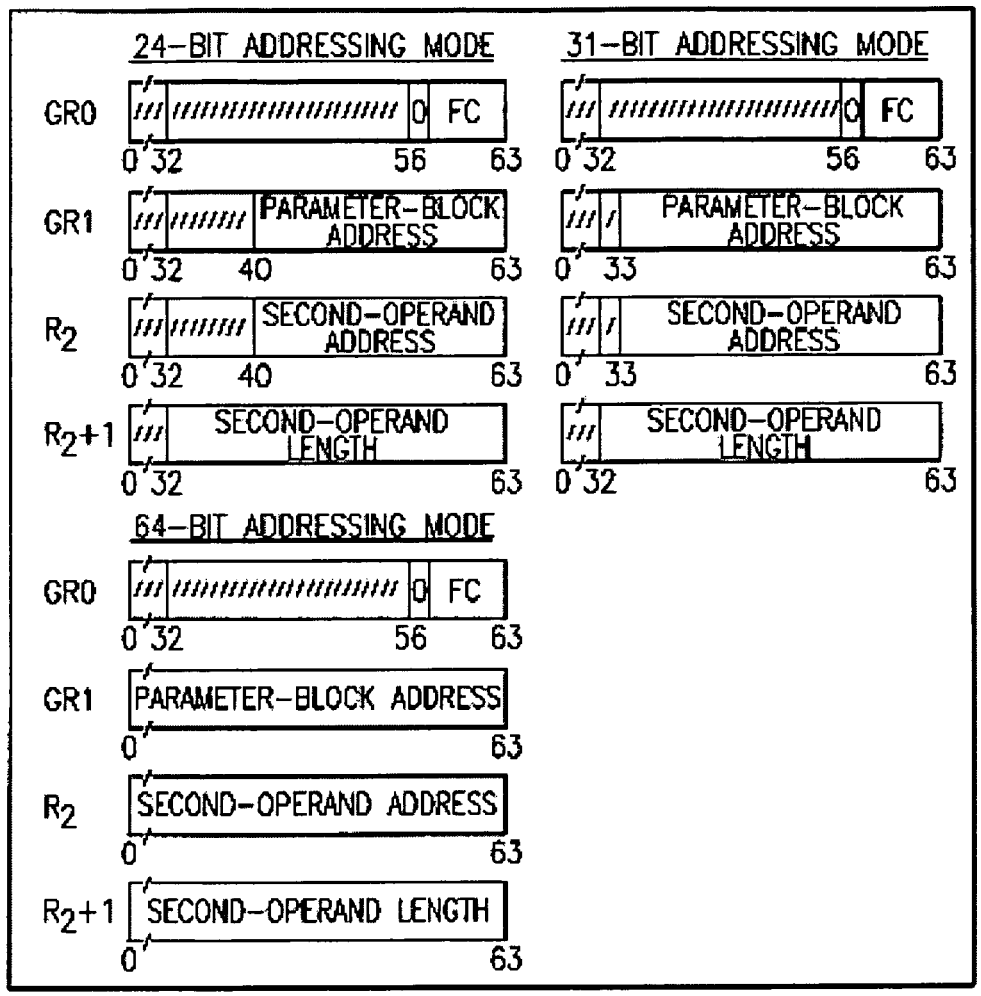
FIG. 3 is an illustration of the general register assignment for the KMAC instruction of FIG. 1.

The COMPUTE MESSAGE AUTHENTICATION CODE (KMAC) instruction will be discussed first, and then a preferred computer system, and, in the alternative, a computer system for emulating a computer system having a different architecture for executing the instruction.

Compute Message Authentication Code (KMAC)

FIG. 1 is an illustration of the Compute Message Authentication Code (KMAC) instruction in the RRE instruction format.

A function specified by the function code in general register 0 is performed. Bits 16-23 of the instruction and the R1 field are ignored.

Bit positions 57-63 of general register 0 contain the function code. FIG. 2 shows the assigned function codes. All other function codes are unassigned. Bit 56 of general register 0 must be zero; otherwise, a specification exception is recognized. All other bits of general register 0 are ignored.

General register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored.

In the 64-bit addressing mode, the contents of bit positions 0-63 of general register 1 constitute the address.

The function codes for COMPUTE MESSAGE AUTHENTICATION CODE are shown in FIG. 2.

All other function codes are unassigned. The query function provides the means of indicating the availability of the other functions. The contents of general registers R2 and R2+1 are ignored.

For all other functions, the second operand is processed as specified by the function code using an initial chaining value in the parameter block and the result replaces the chaining value. The operation also uses a cryptographic key in the parameter block. The operation proceeds until the end of the second-operand location is reached or a CPU-determined number of bytes have been processed, whichever occurs first. The result is indicated in the condition code.

The R2 field designates an even-odd pair of general registers and must designate an even numbered register; otherwise, a specification exception is recognized.

The location of the leftmost byte of the second operand is specified by the contents of the R2 general register. The number of bytes in the second-operand location is specified in general register R2+1.

As part of the operation, the address in general register R2 is incremented by the number of bytes processed from the second operand, and the length in general register R2+1 is decremented by the same number. The formation and updating of the address and length is dependent on the addressing mode.

In the 24-bit addressing mode, the contents of bit positions 40-63 of general register R2 constitute the address of second operand, and are ignored; bits 40-63 of the updated address replace the corresponding bits in general register R_, carries out of bit position 40 of the updated address are ignored and, the contents of bit positions 32-39 of general register R_ are set to zeros. In the 31-bit addressing mode, the contents of bit positions 33-63 of general register R_ constitute the address of second operand, and the contents of bit positions 0-32 are ignored; bits 33-63 of the updated address replace the corresponding bits in general register R_, carries out of bit position 33 of the updated address are ignored, and the content of bit position 32 of general register R_ is set to zero. In the 64-bit addressing mode, the contents of bit positions 0-63 of general register R_ constitute the address of second operand; bits 0-63 of the updated address replace the contents of general register R and carries out of bit position 0 are ignored.

In both the 24-bit and the 31-bit addressing modes, the contents of bit positions 32-63 of general register R2+1 form a 32-bit unsigned binary integer which specifies the number of bytes in the second operand; and the updated value replaces the contents of bit positions 32-63 of general register R2+1. In the 64-bit addressing mode, the contents of bit positions 0-63 of general register R2+1 form a 64-bit unsigned binary integer which specifies the number of bytes in the second operand; and the updated value replaces the contents of general register R2+1.

In the 24-bit or 31-bit addressing mode, the contents of bit positions 0-31 of general registers R2 and R2+1, always remain unchanged.

FIG. 3 shows the contents of the general registers just described.

In the access-register mode, access registers 1 and R2 specify the address spaces containing the parameter block and second operand, respectively.

The result is obtained as if processing starts at the left end of the second operand and proceeds to the right, block by block. The operation is ended when all source bytes in the second operand have been processed (called normal completion), or when a CPU-determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case.

When the chaining-value field overlaps any portion of the second operand, the result in the chaining value field is unpredictable.

Normal completion occurs when the number of bytes in the second operand as specified in general register R+1 have been processed.

When the operation ends due to normal completion, condition code 0 is set and the resulting value in R2+1 is zero. When the operation ends due to partial completion, condition code 3 is set and the resulting value in R2+1 is nonzero.

When the second-operand length is initially zero, the second operand and the parameter block are not accessed, general registers R2 and R2+1 are not changed, and condition code 0 is set.

As observed by other CPUs and channel programs, references to the parameter block and storage operands may be multiple-access references, accesses to these storage locations are not necessarily block-concurrent, and the sequence of these accesses or references is undefined.

Access exceptions may be reported for a larger portion of the second operand than is processed in a single execution of the instruction; however, access exceptions are not recognized for locations beyond the length of the second operand nor for locations more than 4K bytes beyond the current location being processed.

Symbols Used in Function Descriptions

Figure 5:
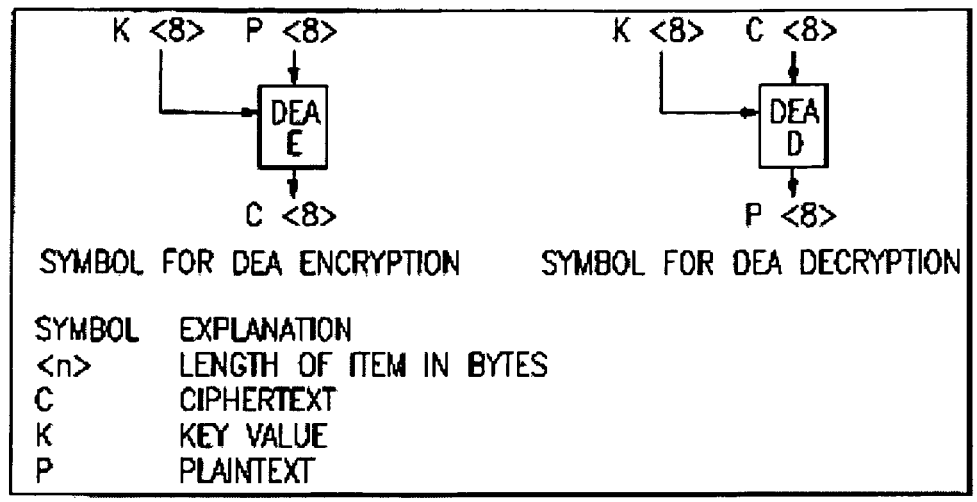
FIG. 5 illustrates symbol for DEA Encryption and Decryption according to prior art.

The symbols of FIGS. 4 and 5 are used in the subsequent description of the COMPUTE MESSAGE AUTHENTICATION CODE functions. For data-encryption-algorithm (DEA) functions, the DEA-key-parity bit in each byte of the DEA key is ignored, and the operation proceeds normally, regardless of the DEA-key parity of the key.

Further description of the data-encryption algorithm may be found in *Data Encryption Algorithm*, ANSI-X3.92.1981, American National Standard for Information Systems.

KMAC-Query (Function Code 0)

The locations of the operands and addresses used by the instruction are as shown in FIG. 3. The parameter block used for the KMAC-Query function has the format shown in FIG. 6.

A 128-bit status word is stored in the parameter block. Bits 0-127 of this field correspond to function codes 0-127, respectively, of the KMAC instruction. When a bit is one, the corresponding function is installed; otherwise, the function is not installed.

Condition code 0 is set when execution of the KMAC-Query function completes; condition code 3 is not applicable to this function.

KMAC-DEA (Function Code 1)

The locations of the operands and addresses used by the instruction are as shown in FIG. 3.

Figure 7:
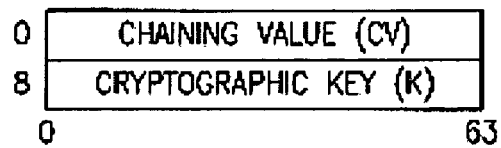
FIG. 7 illustrates the format for the parameter block for KMAC-DEA according to prior art.

The parameter block used for the KMAC-DEA function has the format shown in FIG. 7.

The message authentication code for the 8-byte message blocks (M1, M2, . . . , Mn) in operand 2 is computed using the DEA algorithm with the 64-bit cryptographic key and the 64-bit chaining value in the parameter block.

Figure 8:
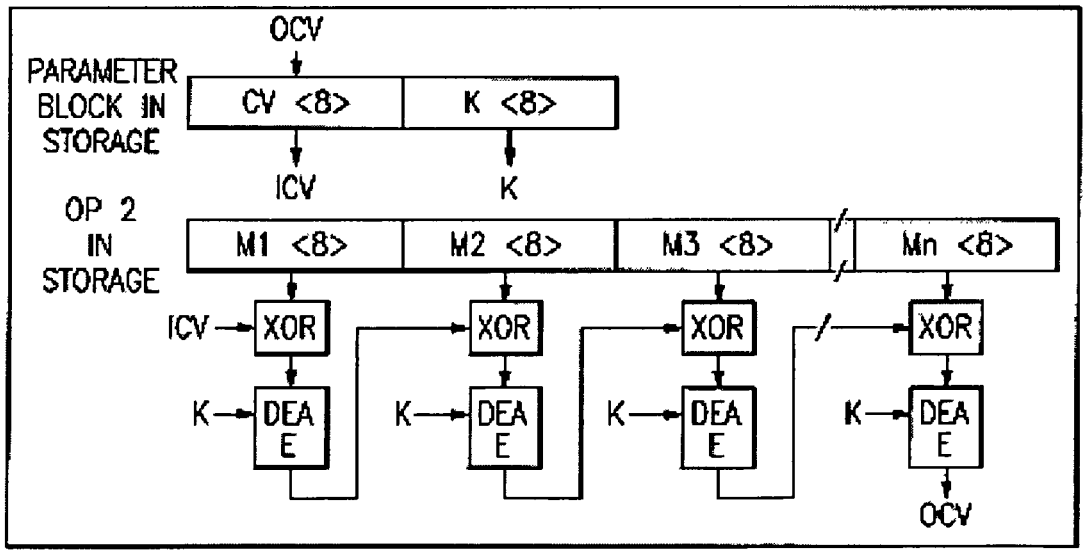
FIG. 8 illustrates the operation of KMAC-DEA.

The message authentication code, also called the output chaining value (OCV), is stored in the chaining-value field of the parameter block. The KMAC-DEA operation is shown in FIG. 8.

KMAC-TDEA-128 (Function Code 2)

The locations of the operands and addresses used by the instruction are as shown in FIG. 3.

Figure 9:
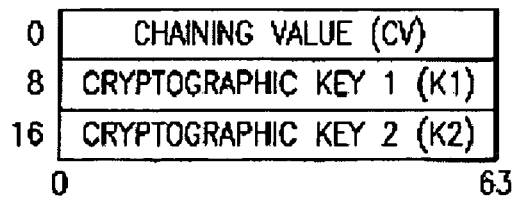
FIG. 9 illustrates the format for the parameter block for KMAC-TDEA-128 according to prior art.

The parameter block used for the KMAC-TDEA-128 function has the format shown in FIG. 9.

The message authentication code for the 8-byte message blocks (M1, M2, ..., Mn) in operand 2 is computed using the TDEA algorithm with the two 64-bit cryptographic keys and the 64-bit chaining value in the parameter block.

Figure 10:
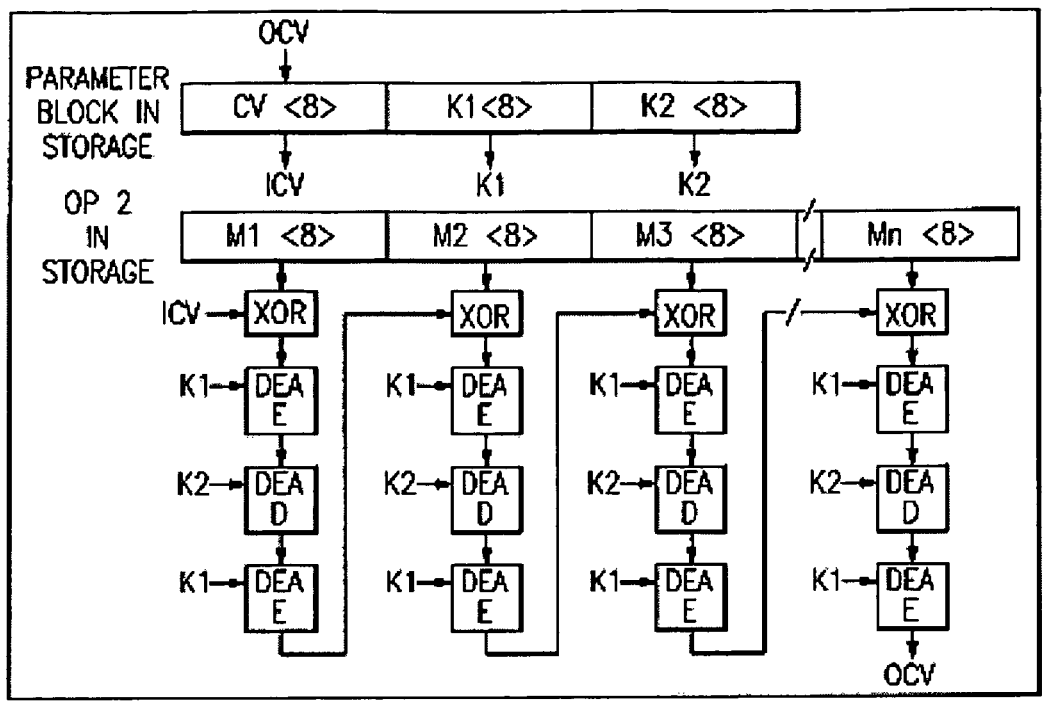
FIG. 10 illustrates the operation of KMAC-TDEA-128.

The message authentication code, also called the output chaining value (OCV), is stored in the chaining-value field of the parameter block. The KMAC-TDEA-128 operation is shown in FIG. 10.

KMAC-TDEA-192 (Function Code 3)

The locations of the operands and addresses used by the instruction are as shown in FIG. 3.

The parameter block used for the KMAC-TDEA-192 function has the format shown in FIG. 11.

The message authentication code for the 8-byte message blocks (M1, M2, ..., Mn) in operand 2 is computed using the TDEA algorithm with the three 64-bit cryptographic keys and the 64-bit chaining value in the parameter block.

Figure 12:
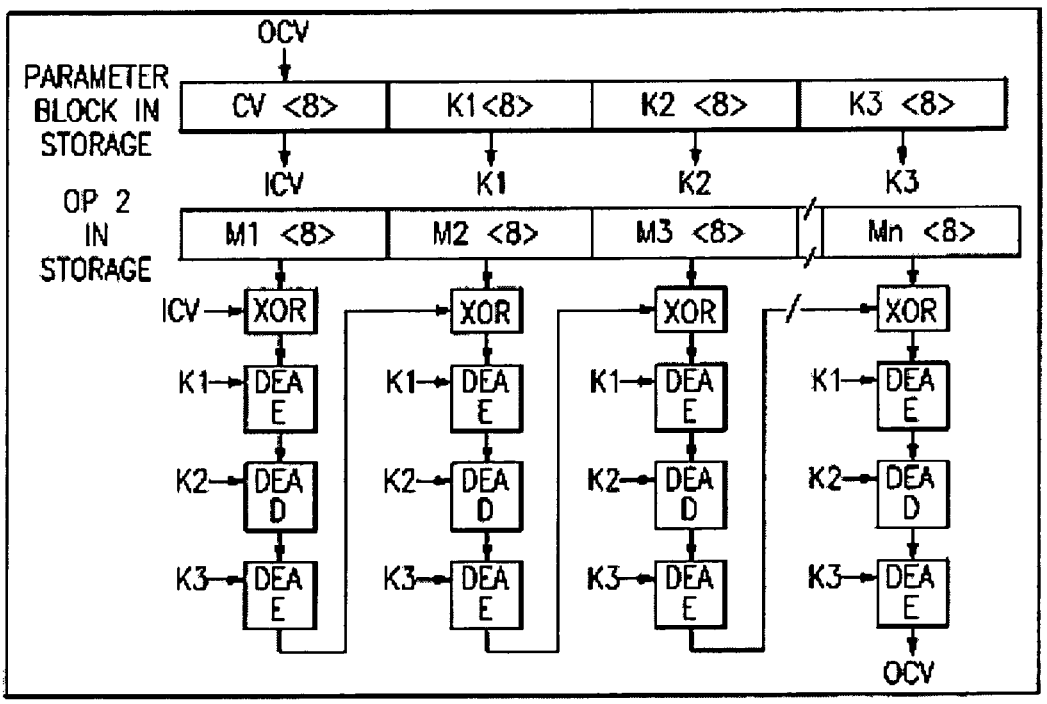
FIG. 12 illustrates the operation of KMAC-TDEA-192.

The message authentication code, also called the output chaining value (OCV), is stored in the chaining-value field of the parameter block. The KMAC-TDEA-192 operation is shown in FIG. 12.

Special Conditions for KMAC

A specification exception is recognized and no other action is taken if any of the following occurs:
1. Bit 56 of general register 0 is not zero.
2. Bits 57-63 of general register 0 specify an unassigned or uninstalled function code.
3. The R_ field designates an odd-numbered register or general register 0.
4. The second-operand length is not a multiple of the data block size of the designated function (see FIG. 7-54 on page 7-92 to determine the data block size for COMPUTE MESSAGE AUTHENTICATION CODE functions.
Resulting Condition Code:
0 Normal completion
1-
2-
3 Partial completion Program Exceptions:
Access (fetch, operand 2, cryptographic key; fetch and store, chaining value)
Operation (if the message-security assist is not installed)
Specification
Programming Notes:
i. Bit 56 of general register 0 is reserved for future extension and should be set to zero.
ii. When condition code 3 is set, the second operand address and length in general registers R2 and R2+1, respectively, and the chaining-value in the parameter block are usually updated such that the program can simply branch back to the instruction to continue the operation. For unusual situations, the CPU protects against endless reoccurrence for the no-progress case. Thus, the program can safely branch back to the instruction whenever condition code 3 is set with no exposure to an endless loop.
iii. If the length of the second operand is nonzero initially and condition code 0 is set, the registers are updated in the same manner as for condition code 3; the chaining value in this case is such that additional operands can be processed as if they were part of the same chain.
iv. Before processing the first part of a message, the program must set the initial values for the chaining-value field. To comply with ANSI X9.9 or X9.19, the initial chaining value shall be set to all binary zeros.

Crypto Coprocessor:

The preferred embodiment provides a crypto coprocessor which can be used with the instructions described herein and to execute cipher messages and assist in a variety of chaining message tasks which can be employed for chained and cryptographic use with the appropriate instructions.

Figure 14:
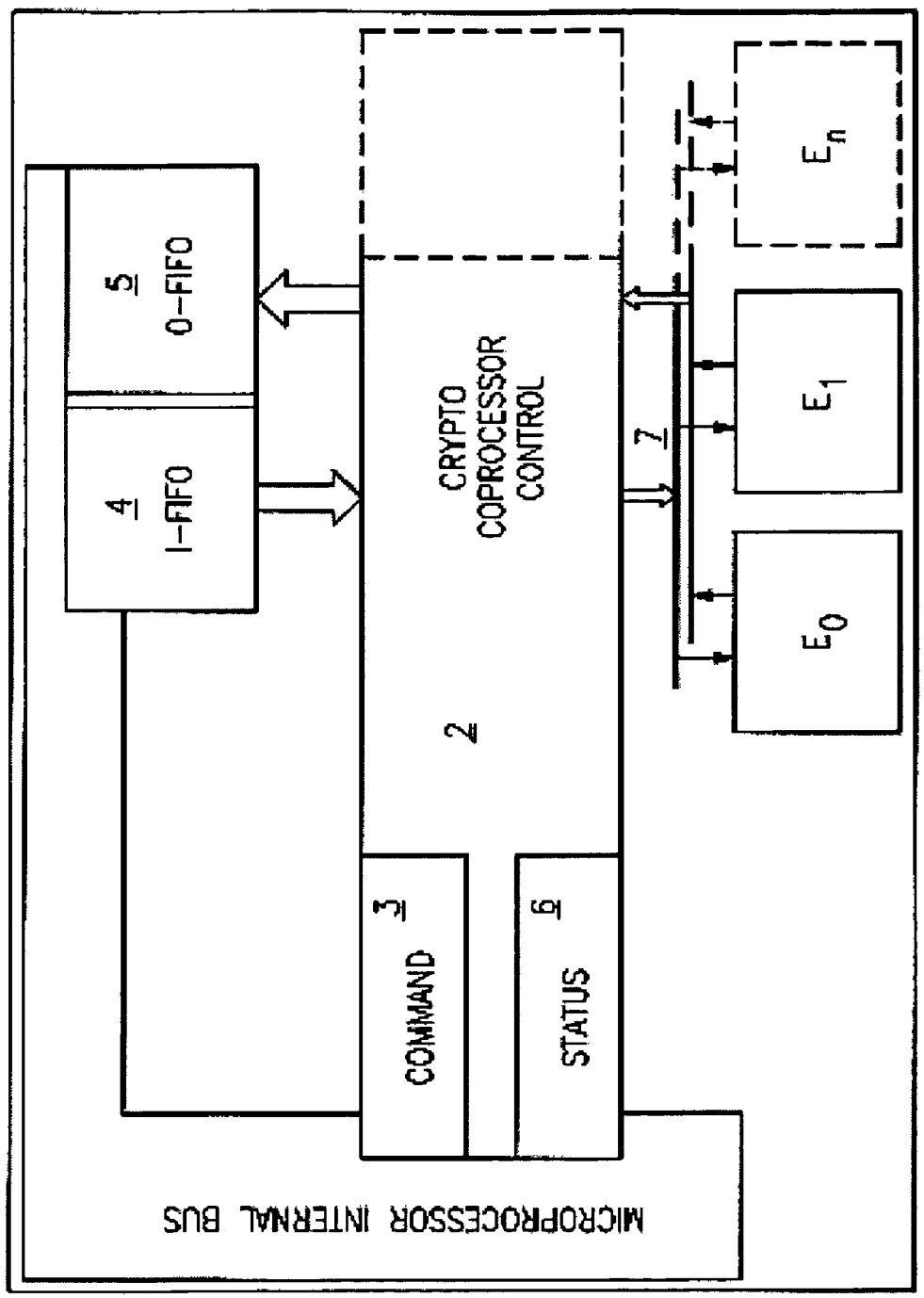
FIG. 14 illustrates our cryptographic coprocessor.

FIG. 14 illustrates our cryptographic coprocessor which is directly attached to a data path common to all internal execution units on the general purpose microprocessor, which has multiple execution pipelines. The microprocessor internal bus (1) is common to all other execution units is attached to the cryptographic control unit (2), and the control unit watches the bus for processor instructions that it should execute.

The cryptographic control unit provides a cryptographic coprocessor directly attached to a data path common to all internal execution units of the central processing unit on a general purpose microprocessor providing the available hardware ($E_0 \ldots E_n$), or from a combination thereof in the preferred embodiment having multiple execution pipelines) for the central processing unit. When a cryptographic instruction is encountered in the command register (3), the control unit (2) invokes the appropriate algorithm from the available hardware. Operand data is delivered over the same internal microprocessor bus via an input FIFO register (4). When an operation is completed the a flag is set in a status register (6) and the results are available to be read out from the output FIFO register (5).

The illustrated preferred embodiment of our invention is designed to be extensible to include as many hardware engines as required by a particular implementation depending on the performance goals of the system. The data paths to the input and output registers (7) are common among all engines.

The preferred embodiment of the invention cryptographic functions are implemented in execution unit hardware on the CPU and this implementation enables a lower latency for calling and executing encryption operations and increases the efficiency.

This decreased latency greatly enhances the capability of general purpose processors in systems that frequently do many encryption operations, particularly when only small amounts of data are involved. This allows an implementation that can significantly accelerate the processes involved in doing secure online transactions. The most common methods of securing online transactions involve a set of three algorithms. The first algorithm is only used one time in a session, and may be implemented in hardware or software, while the other operations are invoked with every transaction of the session, and the cost in latency of calling external hardware as well as the cost in time to execute the algorithm in software are both eliminated with this invention.

Figure 15:
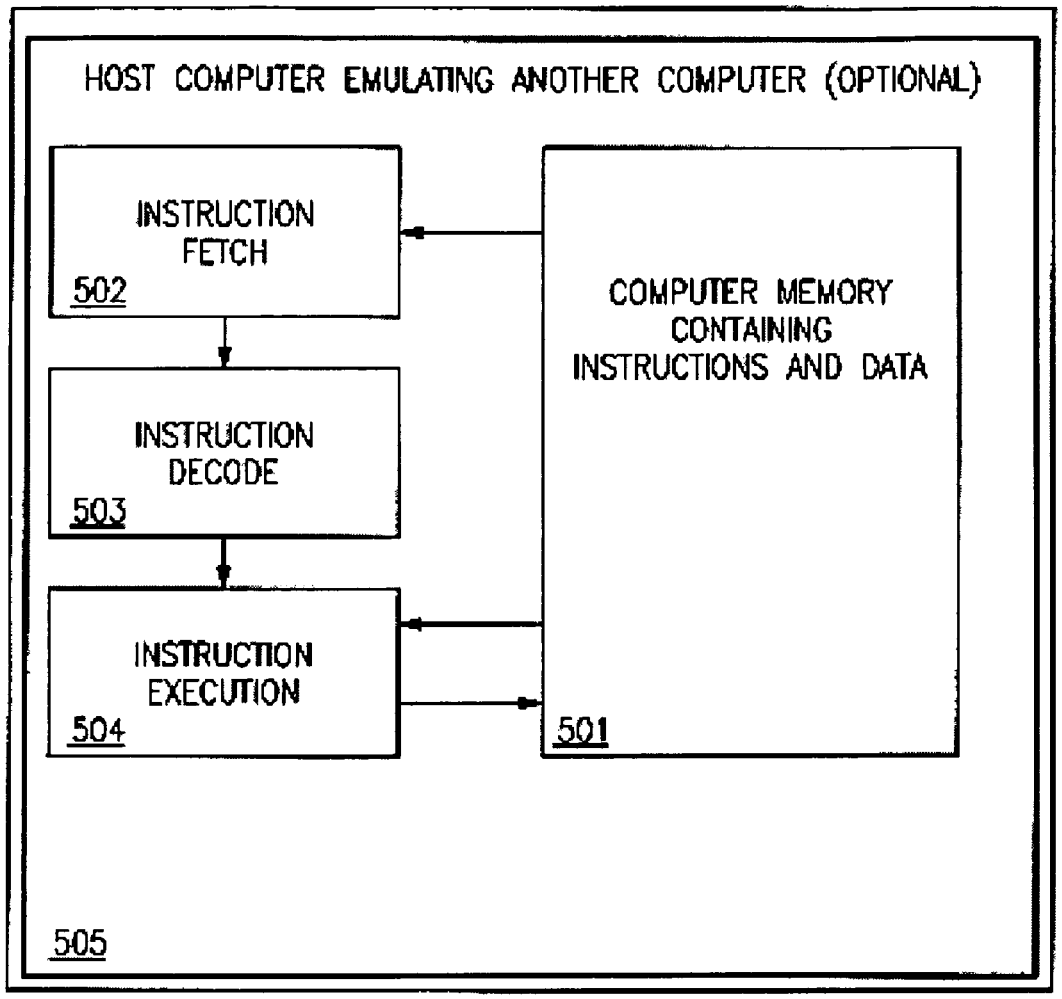
FIG. 15 shows the generalized preferred embodiment of a computer memory storage containing instructions in accordance with the preferred embodiment and data, as well as the mechanism for fetching, decoding and executing these instructions, either on a computer system employing these architected instructions or as used in emulation of our architected instructions.

In FIG. 15 we have shown conceptually how to implement what we have in a preferred embodiment implemented in a mainframe computer having the microprocessor described above which can effectively be used, as we have experimentally proven within IBM, in a commercial implementation of the long displacement facility computer architected instruction format the instructions are used by programmers, usually today "C" programmers. These instruction formats stored in the storage medium may be executed natively in a Z/Architecture IBM Server, or alternatively in machines executing other architectures. They can be emulated in the existing and in future IBM mainframe servers and on other machines of IBM (e.g. pSeries Servers and xSeries Servers). They can be executed in machines running Linux on a wide variety of machines using hardware manufactured by IBM, Intel, AMD, Sun Microsystems and others. Besides execution on that hardware under a Z/Architecture, Linux can be used as well as machines which use emulation by Hercules, UMX, FXI or Platform Solutions, where generally execution is in an emulation mode. In emulation mode the specific instruction being emulated is decoded, and a subroutine built to implement the individual instruction, as in a "C" subroutine or driver, or some other method of providing a driver for the specific hardware as is within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al.; U.S. Pat. No. 6,308, 255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al.; and U.S. Pat. No. 5,790,825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

In the preferred embodiment the existing pre-long displacement instruction formats for a non superscalar instruction form the operand storage address by the summing of the base register and 12 bit unsigned displacement or the base register, the index register, and the 12 bit unsigned displacement and the new long displacement instruction formats form the operand storage address by the summing of the base register and the 20 bit signed displacement or the base register, the index register, and the 20 bit signed displacement.

As illustrated by FIG. 15, these instructions are executed in hardware by a processor or by emulation of said instruction set by software executing on a computer having a different native instruction set.

In FIG. 15, #501 shows a computer memory storage containing instructions and data. The instructions described in this invention would initially stored in this computer. #502 shows a mechanism for fetching instructions from a computer memory and may also contain local buffering of these instructions it has fetched. Then the raw instructions are transferred to an instruction decoder, #503, where it determines what type of instruction has been fetched. #504, shows a mechanism for executing instructions. This may include loading data into a register from memory, #501, storing data back to memory from a register, or performing some type of arithmetic or logical operation. This exact type of operation to be performed has been previously determined by the instruction decoder. The instructions described in this invention would be executed here. If the instructions are being executed natively on a computer system, then this diagram is complete as described above. However, if an instruction set architecture is being emulated on another computer, the above process would be implemented in software on a host computer, #505. In this case, the above stated mechanisms would typically be implemented as one or more software subroutines within the emulator software. In both cases an instruction is fetched, decoded and executed.

More particularly, these architected instructions can be used with a computer architecture with existing instruction formats with a 12 bit unsigned displacement used to form the operand storage address and also one having additional instruction formats that provide a additional displacement bits, preferably 20 bits, which comprise an extended signed displacement used to form the operand storage address. These computer architected instructions comprise computer software, stored in a computer storage medium, for producing the code running of the processor utilizing the computer software, and comprising the instruction code for use by a compiler or emulator/interpreter which is stored in a computer storage medium 501, and wherein the first part of the instruction code comprises an operation code which specified the operation to be performed and a second part which designates the operands for that participate. The long displacement instructions permit additional addresses to be directly addressed with the use of the long displacement facility instruction.

As illustrated by FIG. 15, these instructions are executed in hardware by a processor or by emulation of said instruction set by software executing on a computer having a different native instruction set.

Furthermore, the preferred computer architecture has an instruction format such that the opcode is in bit positions 0 through 7 and 40 through 47.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for executing a message authentication code instruction in a computer system, the method comprising:

determining from a previously defined function code selected from a plurality of function codes a message authentication code operation to-be-executed, the previously defined function code selected from the group consisting of a message authentication code generation operation and a function query operation to-be-executed, wherein the plurality of function codes selected from the group consisting of a KMAC-Query operation, a KMAC-DEA 64-bit key cryptographic operation, a KMAC-Triple DEA two 64-bit key cryptographic operation and a KMAC-Triple DEA three 64-bit key cryptographic operation;

responsive to the determined message authentication code operation to-be-executed being a message authentication code generation operation, performing the message authentication code generation operation on an operand, the message authentication code generation operation comprising a) through b):

a) computing a message authentication code for an operand using one or more cryptographic user keys and an 8 byte chaining value, the operand comprising one or more 8-byte message blocks, wherein the computing the message authentication code produces a new 8 byte chaining value; and b) storing the produced new 8 byte chaining value;

responsive to the determined message authentication code operation to-be-executed being a function query operation, performing the function query operation, the function query operation comprising c) through d):

c) determining for each of one or more message authentication functions whether the message authentication function is installed on the computer system for execution by a message authentication code instruction; and d) saving a status word in a parameter block in memory, the parameter block having an address specified by a first general register, the status word comprising one or more status word bits, each one of the one or more status word bits indicating whether a corresponding one of said one or more message authentication functions is installed on said computer system, each one of the one or more status word bits having a position in the status word corresponding to the function field value of the corresponding message authentication function.

2. The method according to claim 1, wherein computing a message authentication code further comprises:

obtaining the one or more cryptographic user keys;

obtaining the 8 byte chaining value;

x1) obtaining an 8 byte message block of the operand;

X2) exclusive ORing the chaining value with the 8 byte message block of the operand;

X3) using the cryptographic user keys obtained, directly enciphering the result of the exclusive ORing by direct application of the obtained cryptographic user keys to the result of the exclusive ORing to produce a new 8 byte chaining value; and repeating x1) through x3) for successive 8 byte message blocks of the operand.

3. The method according to claim 2, wherein the obtained one or more cryptographic user keys selected from the group consisting of one 64 bit encryption key, two 64 bit encryption keys and three 64 bit encryption keys.

4. The method according to claim 1, wherein the message authentication code instruction comprises:

an opcode field, an R2 field, the R2 field specifying a second general register and a third general register, the second general register containing an address of the operand, wherein the third general register specifies a length of the operand, wherein further the previously defined function code is obtained from a predetermined fourth general register, and wherein the parameter block comprises both the one or more cryptographic user keys and the 8 byte chaining value.

5. The method according to claim 4, further comprising:

incrementing the address of the operand contained in the second general register specified by R2 according a number of bytes processed; and decrementing the length of the operand contained in the third general register specifying the length of the operand according to the number of bytes processed.

6. The method according to claim 1, further comprising:

responsive to the message authentication code operation having been performed on only a portion of the operand at completion of processing, setting a partial completion condition code value as a condition code, the partial completion condition code value indicating that the message authentication code operation is incomplete; and responsive to the message authentication code operation having been performed on all of the operand at completion of processing, setting a normal completion condition code value as a condition code, the normal completion condition code value indicating that the message authentication code operation is complete.

7. A computer program product for computing a message authentication code instruction in a computer system, the computer program product comprising:

a storage medium readable by a processing circuit and storing instructions for execution by the processing circuit for performing a method comprising:

determining from a previously defined function code selected from a plurality of function codes, a message authentication code operation to-be-executed, the previously defined function code selected from the group consisting of a message authentication code generation operation and a function query operation to-be-executed, wherein the plurality of function codes selected from the group consisting of a KMAC-Query operation, a KMAC-DEA 64-bit key cryptographic operation, a KMAC-Triple DEA two 64-bit key cryptographic operation and a KMAC-Triple DEA three 64-bit key cryptographic operation;

responsive to the determined message authentication code operation to-be-executed being a message authentication code generation operation, performing the message authentication code generation operation on an operand, the message authentication code generation operation comprising a) through b):

a) computing a message authentication code for an operand using one or more cryptographic user keys and an 8 byte chaining value, the operand comprising one or more 8-byte message blocks, wherein the computing the message authentication code produces a new 8 byte chaining value; and b) storing the produced new 8 byte chaining value;

responsive to the determined message authentication code operation to-be-executed being a function query operation, performing the function query operation, the function query operation comprising c) through d):

c) determining for each of one or more message authentication functions whether the message authentication function is installed on the computer system for execution by a message authentication code instruction; and d) saving a status word in a parameter block in memory, the parameter block having an address specified by a first general register, the status word comprising one or more status word bits, each one of the one or more status word bits indicating whether a corresponding one of said one or more message authentication functions is installed on said computer system, each one of the one or more status word bits having a position in the status word corresponding to the function field value of the corresponding message authentication function.

8. The computer program product according to claim 7, wherein computing a message authenticating code further comprises:

obtaining the one or more cryptographic user keys;

obtaining the 8 byte chaining value;

x1) obtaining an 8 byte message block of the operand;

X2) exclusive ORing the chaining value with the 8 byte message block of the operand;

X3) using the cryptographic user keys obtained, directly enciphering the result of the exclusive ORing by direct application of the obtained cryptographic user keys to the result of the exclusive ORing to produce a new 8 byte chaining value; and repeating x1) through x3) for successive 8 byte message blocks of the operand.

9. The computer program product according to claim 8, wherein the obtained one or more cryptographic user keys selected from the group consisting of one 64 bit encryption key, two 64 bit encryption keys and three 64 bit encryption keys.

10. The computer program product according to claim 7, wherein the message authentication code instruction comprises:
an opcode field,
an R2 field, the R2 field specifying a second general register and a third general register, the second general register containing an address of the operand, wherein the third general register specifies a length of the operand, wherein further the previously defined function code is obtained from a predetermined fourth general register, and
wherein the parameter block comprises both the one or more cryptographic user keys and the 8 byte chaining value.

11. The computer program product according to claim 10, wherein the method further comprises:
incrementing the address of the operand contained in the second general register specified by R2 according to the number of bytes processed; and
decrementing the length of the operand contained in the third general register specifying the length of the operand according to the number of bytes processed performed.

12. The computer program product according to claim 7, wherein the method further comprises:
responsive to the message authentication code operation having been performed on only a portion of the operand at completion of processing, setting a partial completion condition code value as a condition code, the partial completion condition code value indicating that the message authentication code operation is incomplete; and
responsive to the message authentication code operation having been performed on all of the operand at completion of processing, setting a normal completion condition code value as a condition code, the normal completion condition code value indicating that the message authentication code operation is complete.

13. The computer program product according to claim 7, wherein responsive to the message authentication code instruction not being native to a machine instruction architecture of the microprocessor, the method further comprising:
interpreting the message authentication code instruction to identify a predetermined software routine for emulating the operation of the message authentication code instruction, the predetermined software routine comprising a plurality of instructions; and
executing the predetermined software routine.

14. A system for computing a message authentication code instruction in a computer system, the message authentication code instruction comprising a query function, the system comprising:
a memory;
a general purpose processor in communication with the memory, wherein the computer system performing a method comprising:
determining from a previously defined function code selected from a plurality of function codes, a message authentication code operation to-be-executed, the previously defined function code selected from the group consisting of a message authentication code generation operation and a function query operation to-be-executed, wherein the plurality of function codes selected from the group consisting of a KMAC-Query operation, a KMAC-DEA 64-bit key cryptographic operation, a KMAC-Triple DEA two 64-bit key cryptographic operation and a KMAC-Triple DEA three 64-bit key cryptographic operation;
responsive to the determined message authentication code operation to-be-executed being a message authentication code generation operation, performing the message authentication code generation operation on an operand, the message authentication code generation operation comprising a) through b):
a) computing a message authentication code for an operand using one or more cryptographic user keys and an 8 byte chaining value, the operand comprising one or more 8-byte message blocks, wherein the computing the message authentication code produces a new 8 byte chaining value; and
b) storing the produced new 8 byte chaining value;
responsive to the determined message authentication code operation to-be-executed being a function query operation, performing the function query operation, the function query operation comprising c) through d):
c) determining for each of one or more message authentication functions whether the message authentication function is installed on the computer system for execution by a message authentication code instruction; and
d) saving a status word in a parameter block in the memory, the parameter block having an address specified by a first general register, the status word comprising one or more status word bits, each one of the one or more status word bits indicating whether a corresponding one of said one or more message authentication functions is installed on said computer system, each one of the one or more status word bits having a position in the status word corresponding to the function field value of the corresponding message authentication function.

15. The system according to claim 14, wherein computing a message authenticating code further comprises:
obtaining the one or more cryptographic user keys;
obtaining the 8 byte chaining value;
x1) obtaining an 8 byte message block of the operand;
X2) exclusive ORing the chaining value with the 8 byte message block of the operand;
X3) using the cryptographic user keys obtained, directly enciphering the result of the exclusive ORing by direct application of the obtained cryptographic user keys to the result of the exclusive ORing to produce a new 8 byte chaining value; and repeating x1) through x3) for successive 8 byte message blocks of the operand.

16. The system according to claim 15, wherein the obtained one or more cryptographic user keys selected from the group consisting of one 64 bit encryption key, two 64 bit encryption keys or three 64 bit encryption keys.

17. The system according to claim 14, wherein the message authentication code instruction comprises:
an opcode field,
an R2 field, the R2 field specifying a second general register and a third general register, the second general register containing an address of the operand, wherein the third general register specifies a length of the operand, wherein further the previously defined function code is obtained from a predetermined fourth general register, and
wherein the parameter block comprises both the one or more cryptographic user keys and the 8 byte chaining value.

18. The system according to claim 17, wherein the method further comprises:

incrementing the address of the operand contained in the second general register specified by R2 according to the number of bytes processed; and decrementing the length of the operand contained in the third general register specifying the length of the operand according to the number of bytes processed.

19. The system according to claim 14, wherein the method further comprises:

responsive to the message authentication code operation having been performed on only a portion of the operand at completion of processing, setting a partial completion condition code value as a condition code, the partial completion condition code value indicating that the message authentication code operation is incomplete; and responsive to the message authentication code operation having been performed on all of the operand at completion of processing, setting a normal completion condition code value as a condition code, the normal completion condition code value indicating that the message authentication code operation is complete.

20. The system according to claim 14, wherein responsive to the message authentication code instruction not being native to a machine instruction architecture of the microprocessor, the method further comprising:

interpreting the message authentication code instruction to identify a predetermined software routine for emulating the operation of the message authentication code instruction, the predetermined software routine comprising a plurality of instructions; and executing the predetermined software routine.

* * * * *